Dec. 30, 1952   F. E. OBERMAIER   2,623,542
PILOT OPERATED DIAPHRAGM VALVE
Filed May 12, 1948   2 SHEETS—SHEET 1
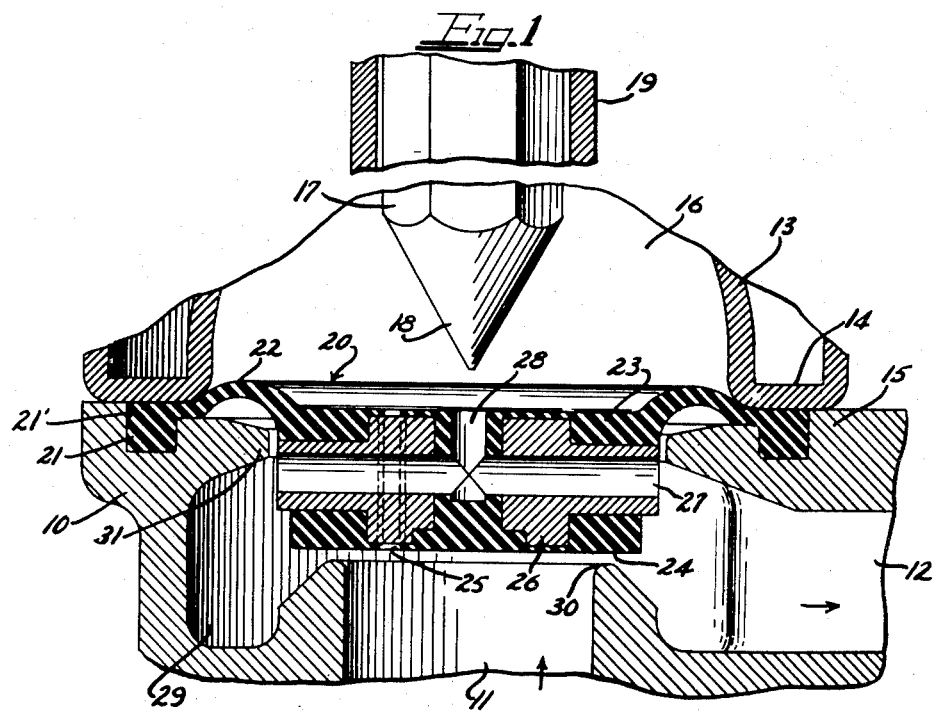
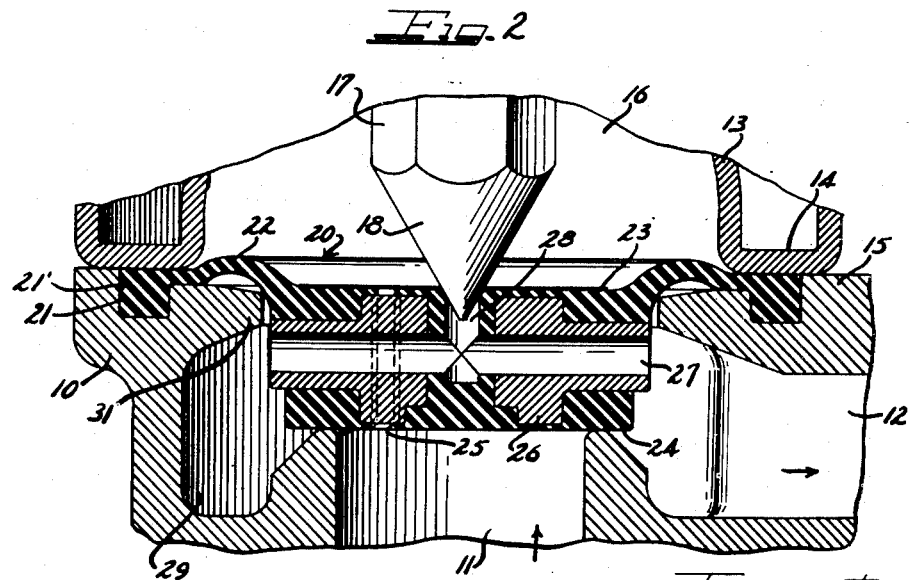
Inventor
FRANK E. OBERMAIER

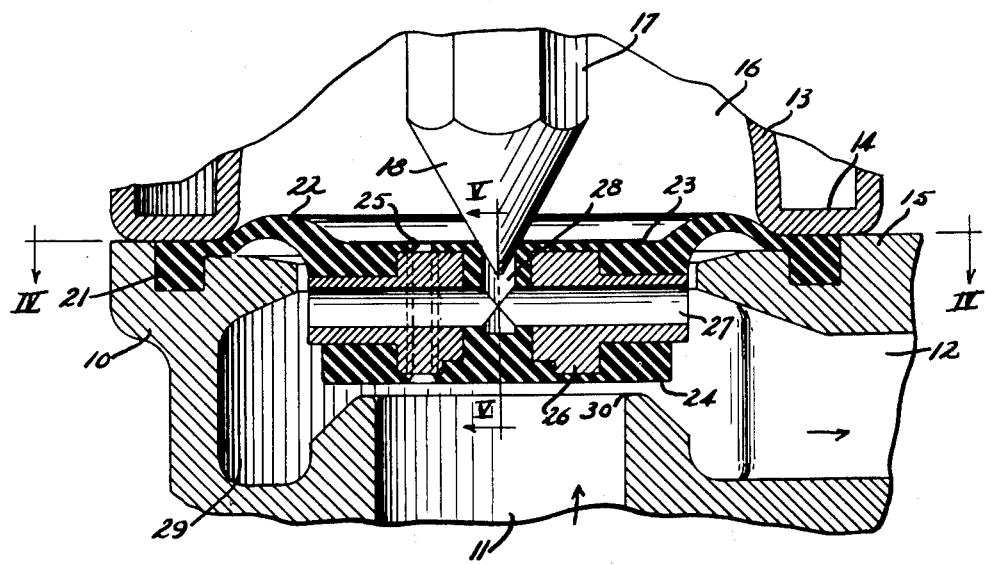
Fig. 3
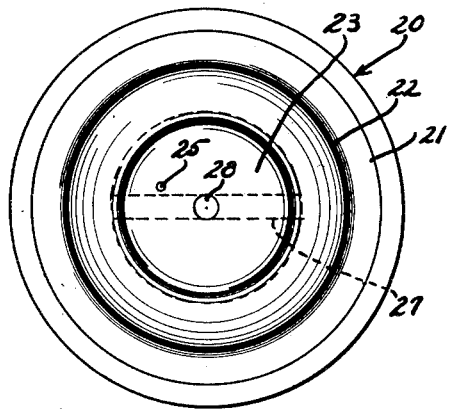
Fig. 4
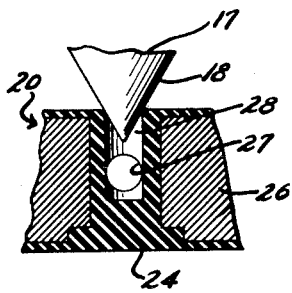
Fig. 5
Fig. 6
Inventor
Frank E. Obermaier Patented Dec. 30, 1952

2,623,542

UNITED STATES PATENT OFFICE 2,623,542

PILOT OPERATED DIAPHRAGM VALVE

Frank E. Obermaier, Oak Park, Ill., assignor to The Dole Valve Company, Chicago, Ill., a corporation of Illinois Application May 12, 1948, Serial No. 26,616

5 Claims. (Cl. 137—665)

This invention relates to a pilot controlled diaphragm type of valve and more particularly to a valve especially adapted for use in mixing valve systems, such as automatic washing machines, and the like.

The valve of this invention is of the same type as that disclosed in the copending application of Leslie A. Kempton, Serial No. 680,421, filed on June 29, 1946, which issued as Patent No. 2,562,315 on July 31, 1951, and may be used, for example, in a mixing valve system of the same general type as that disclosed in the copending application of Leslie A. Kempton, Serial No. 719,827, filed January 2, 1947 which issued as Patent No. 2,560,293 on July 10, 1951.

An object of this invention is to provide a pilot controlled diaphragm valve especially useful in controlling the flow of water and which inherently reduces to a minimum the amount of water hammer or chatter incident to the operation of the valve.

Another object of this invention is to provide a valve of the foregoing type in which the closing movement is opposite to the inlet flow of the fluid so as to be cushioned thereby.

Another object of this invention is to provide a pilot controlled valve diaphragm which lends itself to economical manufacture and yet which is rugged in use.

Yet another object of this invention is to provide a valve diaphragm generally of a resilient flexible construction and which embodies in itself bleeder and pilot openings as well as a by-passing passageway.

In accordance with the general features of this invention there is provided in a pilot controlled diaphragm type of valve, including a housing having an inlet and an outlet as well as a fluid receiving chamber, a flexible diaphragm secured in said housing transversely of and adapted to seat on the inlet side of the housing to close the inlet directly against the pressure of the incoming fluid, a diaphragm having a bleeder hole extending transversely therethrough from the inlet to the fluid chamber, a lateral passageway in communication with the outlet and a central pilot receiving opening on the side of the diaphragm opposite the inlet, connecting said chamber to said passageway and normally closed when the valve is shut, but upon opening by-passing fluid bled into said chamber to said outlet to cause pressure of the incoming fluid to unseat said diaphragm thereby placing the inlet in direct communication with the outlet.

Another feature of this invention relates to the provision of flange means in the housing for limiting the deflection of the diaphragm, or, in other words, providing a shoulder against which a flexible portion of the diaphragm may rest when the diaphragm is forced to its seat in closed position.

Other objects and features of this invention will more fully appear from the following detailed description taken in connection with the accompanying drawings which illustrate a single embodiment thereof and in which Figure 1 is a fragmentary cross sectional view through a pilot controlled diaphragm valve in open position embracing the features of this invention, with the pilot and solenoid for operating the same being more or less shown diagrammatically;

Figure 2 is a fragmentary sectional view similar to Figure 1, but showing the valve in closed position;

Figure 3 is a sectional view similar to Figure 1, showing the pilot in engagement with the diaphragm just prior to the movement of the diaphragm to its seated or closed position;

Figure 4 is a plan view of the diaphragm taken on substantially the line IV—IV of Figure 3, looking downwardly;

Figure 5 is a fragmentary vertical sectional view taken on substantially the line V—V of Figure 3, looking in the direction indicated by the arrows; and Figure 6 is a fragmentary sectional view through the bleeder hole portion of the diaphragm.

As shown on the drawings:

In the accompanying drawings the reference character 10 designates generally a housing which may comprise a casting and which includes an inlet 11 and an outlet 12. The housing 10 also includes an upper part or cap 13 detachably secured to the housing 10 by any suitable means (not shown), such as bolts, cap screws or the like. In reality, the top part or cap 13 of the housing includes a flange 14 clamped to an annular flange 15 of the housing member 10 in a manner well known to those familiar with the diaphragm valve art.

The cap 13 defines a sealed fluid chamber 16 in which extends a pilot element 17 having a conical point 18 at its lower end for cooperation with the diaphragm 20, to be hereinafter described.

The pilot element 17 normally tends to gravitate by its own weight to a lower position, which position it assumes in the closing of the valve. Any suitable means may be employed for raising the pilot element 17 out of cooperation with the diaphragm, such, for example, as a solenoid 19, shown more or less diagrammatically in the drawing.

This invention is not concerned specifically with the means for raising the pilot but rather with the construction of the diaphragm element and its arrangement with respect to the inlet and outlet, 11 and 12, respectively.

The diaphragm 20 which for the most part is made of resilient material such as rubber-like material or a synthetic plastic material includes a marginal flange portion 21 seated in an annular slot 21' in the flange 15 of the housing member 10. It is anchored or clamped in position by the upper housing or cap member 13.

In addition, the diaphragm 20 includes an upwardly bowed annular flexible rib 22 which connects the flange 21 to a central or downwardly depending portion 23 of the diaphragm and which latter portion constitutes the valve closing portion of the diaphragm. This central portion 23 has a resilient lower face 24 adapted to seat on an annular edge 30 about the inlet 11 in the closing of the valve. In addition, the central portion has laterally offset from its center a transverse bleeder opening 25 (Fig. 6) for allowing fluid to be bled from the inlet 11 into the chamber 16 when the valve is in closed position. The bleeder hole or opening 25 is completely defined by a rubber or resilient tubular portion 25' formed integral with the diaphragm 20. This is advantageous in that it prevents high pressure water in inlet 11 and chamber 16 from working its way between the rubber and insert 26 and into unbalanced area 29.

Suitably imbedded in the central diaphragm portion 23 is a metallic insert 26. This insert is incorporated in the diaphragm at the time the diaphragm is molded. It includes a transverse or horizontal passageway 27 extending clear through the center portion 24 and is at all times in communication with the outlet 12. This passageway may be provided by boring the insert.

Located centrally of the depending portion 24 is a central pilot receiving opening 28 in communication at its outer end with the chamber 16 and at its inner end with an intermediate portion of the passageway 27. This opening may likewise comprise a bored hole in the diaphragm. The outer end of this opening 27 is adapted to receive the top of the conical end 18 of the pilot element when the valve is in closed position or in the process of being closed, as shown in Figures 2 and 3.

The bleeder hole 25 is of an area not more than 90% of that of opening 28 since if it is more than that the diaphragm will not function properly or open.

It will be perceived that the housing member 10 has an annular passage 29 around the depending diaphragm portion 23 which is at all times in communication with the outlet 12. One side of this passage 29 is defined by an annular flange 31 which, when the valve is closed, can serve as a support for limiting the deflection of the rib 22 toward the inlet 11, as shown in Figure 2.

When the valve is in closed position, as shown in Figure 2, the weight of the pilot element 17 is applied to the central portion 23 of the diaphragm which portion is tightly seated about the inlet 11 for disconnecting the inlet completely from the outlet 12. In this position, fluid under pressure from the inlet is applied to the portion of the underface 24 of the diaphragm exposed to the fluid in the inlet. Some of this fluid is bled through the passageway 25 into the chamber 16 where the pressure is effective over a much greater area of the diaphragm than on the inlet side. As a consequence, the valve is maintained shut against the pressure of the incoming fluid by the pressure of the fluid itself.

When it is desired to open the valve, the energizing of the solenoid 19 causes the pilot element 17 to be raised out of cooperation with the central hole 28 in the diaphragm (Fig. 1). This immediately results in fluid in the chamber 16 flowing through the opening 28 into the passageway 27 and from there into the outlet 12. Since the pressure on the diaphragm side is lessened to a point where it is below that acting on the surface 24 the central portion of the diaphragm is forced off its seat 30, thereby putting the inlet 11 in direct communication with the outlet 12, as shown in Figure 1.

In Figure 3 the valve is shown in the process of being closed. The deenergizing of the solenoid 19 results in the pilot element 17 gravitating into engagement with the diaphragm with the point 18 of the element closing off the central opening 28. This results in the weight of the pilot element 17 being applied against the diaphragm. It further results in fluid pressure being built up in the chamber 16 by reason of the fluid passing through the bleeder hole 25 into the chamber 16 where it is trapped.

As noted before, the effective area of the pressure surface at the top of the diaphragm 20 is much greater than the area of the lower diaphragm surface 24. As a consequence, when the pressure of the weight of the pilot element 17 on the diaphragm together with the built up fluid pressure acting on the top of the diaphragm exceeds the pressure of the fluid acting on the surface 24, the diaphragm will move downwardly into engagement with its seat 30, thus closing the valve.

The downward or closing movement of the diaphragm 20 is against the pressure of the incoming fluid so that this pressure acts to cushion the closing movement of the diaphragm thereby substantially reducing so called water chatter or hammer to a minimum.

It will be appreciated that while my diaphragm valve is particularly adapted for use in controlling the flow of water it may be used with equal advantage in conjunction with other types of fluids.

The diaphragm 20 when assembled in the valves is not in its free position. That is to say, the seat portion 24 on the diaphragm is raised closer to the face of the ceiling bead. As a result, there is an initial downward thrust which enables the valves to seal at very low pressures. If the diaphragm was assembled in its free position, it would be necessary to install a spring on the top of the diaphragm in order to obtain this initial tension.

I claim as my invention:

1. In a pilot controlled diaphragm type valve including a housing having an inlet, an outlet and a fluid receiving chamber, a flexible diaphragm secured in said housing transversely of and adapted to seat on the inlet side of the housing to close the inlet against the pressure of incoming fluid, said diaphragm having a bleeder hole extending transversely therethrough from the inlet to said chamber, a lateral passageway in communication with the outlet and a central pilot receiving opening opposite the valve seat in communication with said passageway to said chamber, a pilot in axial alignment with said opening and mounted for movement into engagement with said opening to close the same and to act on said diaphragm in a valve closing direction, said opening being normally closed when the valve is shut and upon opening, by-passing fluid bled into said chamber to said outlet to enable the pressure of the incoming fluid to move said diaphragm off its seat placing said inlet and outlet in direct communication, and means for unseating said pilot.

2. In a pilot controlled diaphragm type valve including a housing having an inlet, an outlet and a fluid receiving chamber, a flexible diaphragm secured in said housing transversely of and adapted to seat on the inlet side of the housing to close the inlet against the pressure of incoming fluid, said diaphragm having a bleeder hole extending transversely therethrough from the inlet to said chamber, a lateral passageway in communication with the outlet and a central pilot receiving opening opposite the valve seat in communication with said passageway to said chamber, normally closed when the valve is shut and upon opening, by-passing fluid bled into said chamber to said outlet to enable the pressure of the incoming fluid to move said diaphragm off its seat placing said inlet and outlet in direct communication, and an externally controlled pilot element extending through said chamber and formed to extend into and seat on the edge of said diaphragm opening when the valve is closed and upon unseating placing said chamber in communication with the outlet through said passageway the closing force of said pilot acting on said diaphragm being effective to urge said diaphragm toward a closed position.

3. In combination a diaphragm for a pilot controlled valve including a housing having an inlet, an outlet and a fluid receiving chamber, said diaphragm comprising a peripheral portion adapted to be clamped in the housing, a central portion formed to sealingly seat on the inlet side of the housing to disconnect the inlet from the outlet and directly against the pressure of the incoming fluid and an annular flexible rib portion connecting the central portion to the peripheral portion, said central portion having a bleeder hole extending transversely therethrough from the inlet side and communicating with the chamber, a lateral passageway in communication with the outlet and a central pilot receiving opening on the side of the diaphragm opposite its seat connecting said passageway to said chamber, a pilot in axial alignment with said opening and mounted for movement into engagement with said opening for closing the same and urging said diaphragm toward valve closing position, said opening being normally closed when the valve is shut and upon opening by-passing fluid bled into said chamber to said outlet to cause said central portion to be flexibly moved away from said seat by the pressure of the incoming fluid in said inlet thus opening the valve, and means for unseating said pilot.

4. In a pilot controlled diaphragm type valve, a housing having an inlet, an outlet, and a fluid receiving chamber, and a resiliently flexible diaphragm having a peripheral portion anchored in the housing, a central valve controlling portion and an annular resilient humped rib connecting the central portion to the peripheral portion, said central portion being formed on one side to seat on the inlet side of the housing to close the inlet directly against the pressure of the incoming fluid, said central portion also having a bleeder hole extending transversely therethrough from the inlet to said chamber, a lateral passageway in communication with the outlet, a central pilot receiving opening opposite the inlet side of the diaphragm and connecting said passageway to said chamber, a pilot in axial alignment with said opening and mounted for movement into engagement with said opening for closing the same and urging said diaphragm toward valve closing position, said pilot opening being normally closed when the valve is shut and upon opening by-passing fluid bled into said chamber to said outlet to cause pressure of said incoming fluid to move said diaphragm central portion off its seat placing said inlet and outlet in direct communication with each other, and means for unseating said pilot.

5. In a pilot controlled diaphragm type valve, a housing having an inlet, an outlet, and a fluid receiving chamber, and a resiliently flexible diaphragm having a peripheral portion anchored in the housing, a central valve controlling portion and an annular resilient humped rib connecting the central portion to the peripheral portion, said central portion being formed on one side to seat on the inlet side of the housing to close the inlet directly against the pressure of the incoming fluid, said central portion also having a bleeder hole extending transversely therethrough from the inlet to said chamber, a lateral passageway in communication with the outlet, a central pilot receiving opening opposite the inlet side of the diaphragm and connecting said passageway to said chamber, a pilot in axial alignment with said opening and mounted for movement into engagement with said opening for closing the same and urging said diaphragm toward valve closing position, said pilot opening being normally closed when the valve is shut and upon opening by-passing fluid bled into said chamber to said outlet to cause pressure of said incoming fluid to move said diaphragm central portion off its seat placing said inlet and outlet in direct communication with each other, means for unseating said pilot and said housing having flange means projecting toward said central diaphragm portion in close proximity to said rib for limiting the deflection of the rib upon movement of the diaphragm central portion into seated position.

FRANK E. OBERMAIER.

REFERENCES CITED

The following references are of record in the file of this patent:

UNITED STATES PATENTS

| Number | Name | Date |
|---|---|---|
| 1,390,851 | Winckler | Sept. 13, 1921 |
| 1,474,472 | Gulick | Nov. 20, 1923 |
| 1,925,301 | Campbell | Sept. 5, 1933 |
| 2,084,030 | Hoppe | June 15, 1937 |
| 2,212,607 | Langdon | Aug. 27, 1940 |
| 2,216,571 | Mikalsen | Oct. 1, 1940 |

FOREIGN PATENTS

| Number | Country | Date |
|---|---|---|
| 64,639 | Sweden | Feb. 21, 1938 |